United States Patent [19]

Chen

[11] Patent Number: 4,820,090

[45] Date of Patent: Apr. 11, 1989

[54] MULTIPURPOSE HANDLE GRIP FOR HOLDING ELECTRIC TOOLS

[76] Inventor: Pi-Chi Chen, No. 1-1, East Lane, Lai Tsuo, Taichung, Taiwan

[21] Appl. No.: 201,816

[22] Filed: Jun. 3, 1988

[51] Int. Cl.$^{4}$ .............................................. B23B 47/00

[52] U.S. Cl. ............................. 408/241 R; 16/116 R; 81/177.4

[58] Field of Search ................. 16/116 R; 408/239 R, 408/241 R; 279/1 K; 81/177.4, 438, 439

[56] References Cited

FOREIGN PATENT DOCUMENTS

| | | | |
|---|---|---|---|
| 3400068 | 7/1985 | Fed. Rep. of Germany | 81/177.4 |
| 3445075 | 6/1986 | Fed. Rep. of Germany | 408/241 R |
| 3514023 | 10/1986 | Fed. Rep. of Germany | 408/241 R |
| 2165480 | 4/1986 | United Kingdom | 408/241 R |

*Primary Examiner*—Fred A. Silverberg

*Attorney, Agent, or Firm*—Varndell Legal Group

[57] ABSTRACT

The present invention provides a multipurpose handle grip for holding electric tools, more particularly a handle for slipping on an electric driver or electric drill to effectively carry and release the driver head or the drill and to stably facilitate the operation of the electric tools and comprises a driver head strap, a handle plate and a locating bushing; the driver head strap comprising a plurality of slip holes around the circumference arranged in good order, an inner thread at the rear end for connection of the strap with the holder plate of the handle plate by way of a screw joint, and a transparent revolving cover, the revolving cover having a circular outlet; the locating bushing having a smaller inner diameter for easy insertion of the bushing into the locating hole of the holder plate for fixation of electric tools of different size; the handle plate comprising a handle and a holder plate, the holder plate having a locating hole for fixation of electric tools, a flange at the front and an outer thread on the flange, and a block plate arranged at one side of the holder plate, the handle comprising a plurality of channel holes around the inner wall arranged in good order for storage of drill heads, and a revolving cap arranged at the bottom, the revolvong cap having an circular outlet; by way of this arrangemet, the present handle grip being applicable for carrying a variety of drill and driver heads for easy operation of electric tools.

2 Claims, 3 Drawing Sheets

MULTIPURPOSE HANDLE GRIP FOR HOLDING ELECTRIC TOOLS

BACKGROUND AND SUMMARY OF THE INVENTION

Following the development in industry, mechanical tools are improving, for instance, the use of electric drills and screw drivers is very popular now to efficiently loosen the screw or drill a hole. The application of electric tools help to improve working efficiency. However, there are still problems, such problems are as described hereinafter:

1. Vibration happens while operating an electric drill or screw driver, the structure of the electric drill or screw driver has only one single handlebar for holding by one single hand, such kind of arrangement for one single hand to hold the electric tool is easy to tear the tool or the parts, and the efficiency and the quality can not secured.

2. During the operation, due to different size of screws to be loosened or different diameter of drilling hole required, the drill or driver heads need to be replaced frequently, thereby, the drill or driver heads may be disorderly spread over the ground and the selection and collection of the drill and driver heads are very difficult.

In view of the said problems, the present inventor, after having invested a large amount of capital and a long term experimentation, has finally created the present invention.

The main object of the present invention is to provide an improved handle grip for holding electric tools to help the operator stably hold the electric tools by means of the present handle grip during the operation so as to reduce the vibration and to accurately perform the desired operation.

Another object of the present invention is to provide an improved handle grip for holding electric tools wherein the driver head strap is provided for storage of a variety of driver heads and is connected with the holder plate of the handle plate by means of screw joint for alternative operation.

Another object of the present invention is to provide an improved handle grip for holding electric tools wherein the handle of the handle plate is provided with a plurality of channel holes around the inner wall arranged in good order for storage of diversified drill heads thereinside for further selection.

A yet further object of the present invention is to provide an improved handle grip for holding electric tools wherein a block plate is arranged at one side of the holder plate for connection of a locating rod to control the drilling depth during the operation by means of the adjustment of the locating rod.

BRIEF DESCRIPTION OF THE DRAWINGS

FIG. 2-1 is a top plan view of channel holes of the present invention.

DETAILED DESCRIPTION OF THE PREFERRED EMBODIMENT

The present invention relates to a multipurpose handle grip for holding electric tools and more particularly a handle for slipping on an electric screw driver or electric drill to effectively carry or release the driver head or the drill and stably facilitate the operation of the electric tools.

Figure 1:
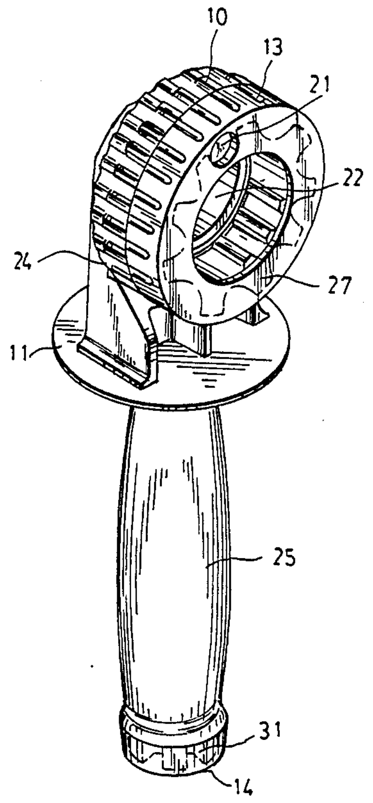
FIG. 1 is a perspective view of a handle grip embodying the present invention.
Figures 1, 2:
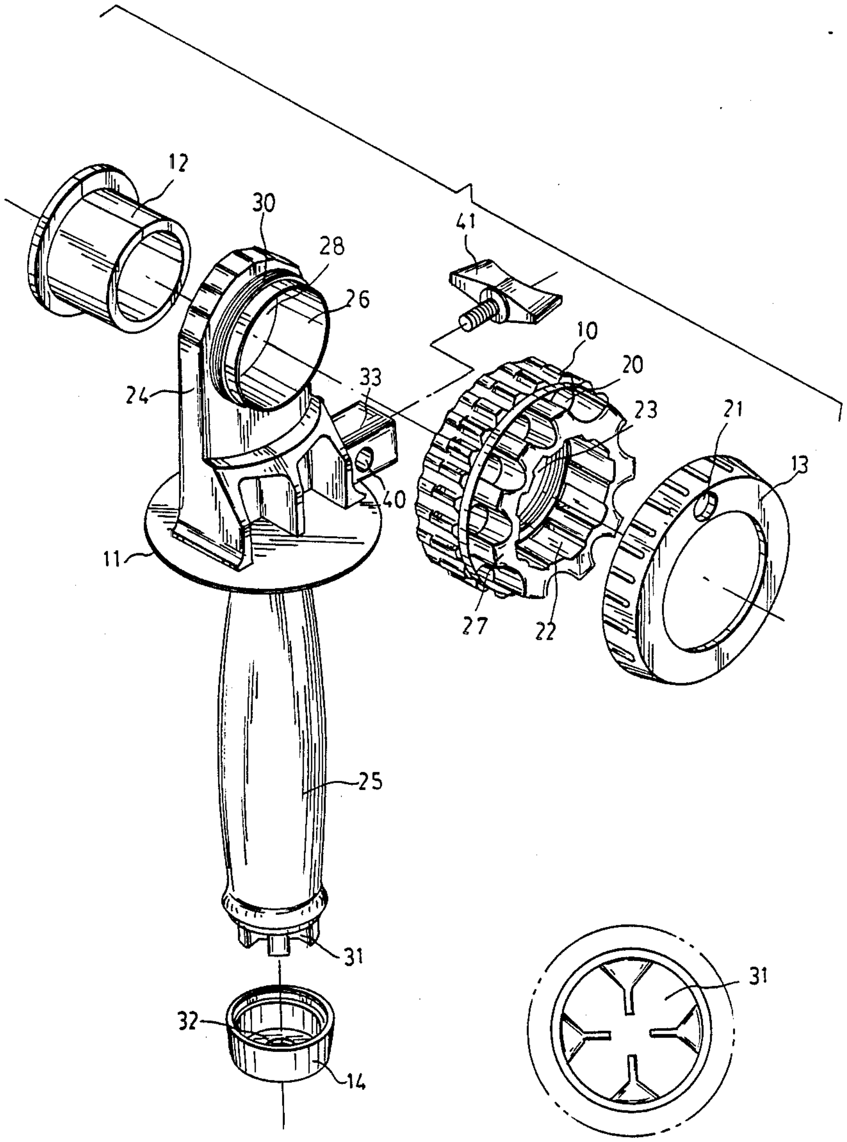
FIG. 2 is a fragmentary perspective view of the preferred embodiment according to the present invention.
Figure 3:
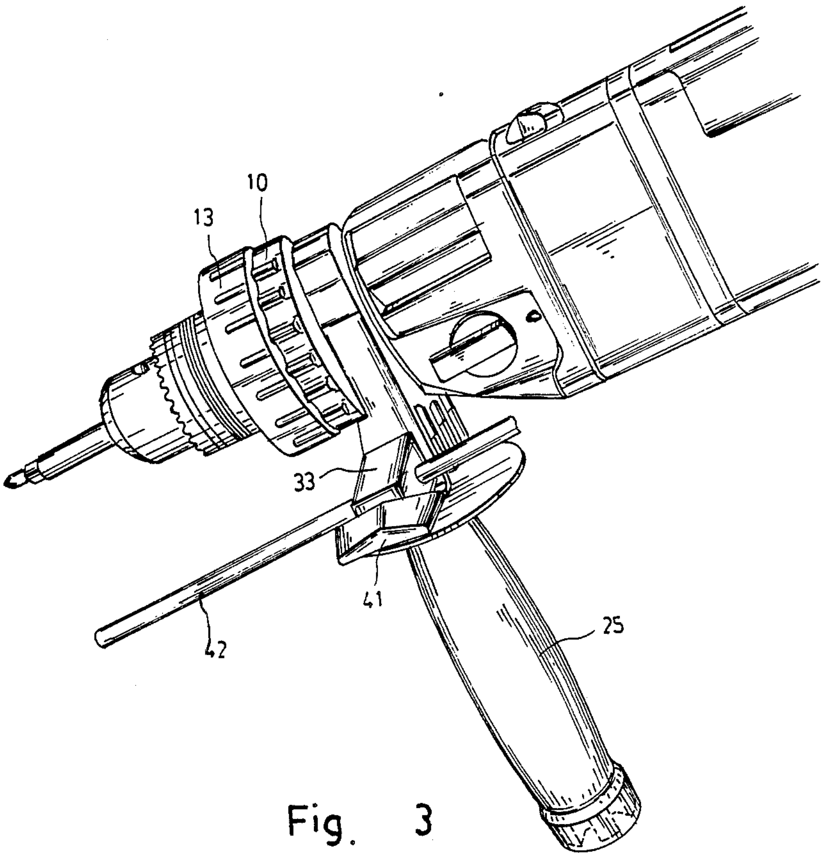
FIG. 3 illustrates the application of the preferred embodiment according to the present invention in conjunction with an electric tool.

As shown in FIGS. 1, 2 and 3, the handle according to the present invention comprises a driver head strap 10, a handle plate 11, and a locating bushing 12. Said driver head strap 10 comprises a plurality of slip holes 20 circularly aligned around its circumference, a transparent revolving cover 13 on the top which comprises a circular outlet 21, a circular central hole 22, and an inner thread 23 at the rear end. Said handle plate 11 comprises a handle 25 and a holder plate 24, said holder plate 24 comprises a locating hole 28 for all locations of the electric tool, an outer thread 30 at the front flange 26 and a block plate 33 that has a connection hole 40; said handle 25 comprises a plurality of channel holes 31 aligned in good order along the inner wall and a revolving cap 14 at the bottom, said revolving cap 14 has a circular outlet 32. Said locating bushing 12 is for insertion into the location hole 28 of the holder plate 24 and the circular central hole 22 of the driver head strap 10 for holding a variety of electric tools.

The slip holes 20 around the circumference of the driver head strap 10 are arranged for storage of different driver heads. To take a driver head from the strap, the revolving cover 13 is turned so that the circular outlet 21 is aimed at the slip hole 20 whereby the inside driver head can be easily taken out. After the inside driver head is taken out, the revolving cover 13 is turned again so that the circular outlet 21 is aimed at the division plate 27 to close the circular outlet 21. The channel holes 31 around the inner wall of the handle 25 are arranged for storage of a variety of drill heads and the drill heads can be taken out for operation by means of turning the revolving cap 14.

The driver head strap 10 is attached to the flange 26 of the holder plate 24 by means of a screw joint between the inner thread 23 and the outer thread 30. This holds an electric tool through the locating hole 28 (as shown in FIG. 3) such that the operator can stably hold the electric tool with both hands by means of the handle 25 to reduce the vibration, facilitate the operation and the change of drill or driver head and prevent displacement. In order to match with electric tools of different specifications said locating bushing 12 is to be inserted into the locating hole 28 of the holder plate 24 for holding electric tools of different size.

Said strap 10 can be detached whenever required from the handle plate 11 to thereby connect or disconnect the assembly from or to an electric tool directly for convenient carrying, storage and application.

A locating rod 42 can be inserted into the connection hole 40 of the block plate 33 at one side of the holder plate 24 by means of a revolving screw plate 41 (as shown in FIG. 3) for easy control of the preferred drilling depth to improve the working efficiency.

As described above, the present invention is to help the operator stably hold the electric tool to reduce the vibration while working and preventing tearing or displacement; and by means of the special design for storage of a variety of drill and driver heads improves the working efficiency.

I claim:

1. A multipurpose handle grip for holding electric tools comprising:

a driver head strap having a plurality of slip holes around the circumference and arranged in good order, a plurality of division plates arranged among the slip holes, a central circular hole, an inner thread at the rear end, and a revolving cover at the front end, said revolving cover having a circular outlet;

a handle plate comprising a handle and a holder plate, said holder plate being located at a top end and having a locating hole, a flange, an outer thread on the flange, said handle having a plurality of channel holes around the inner wall arranged in good order and a revolving cap at a bottom end, said revolving cap comprising a circular outlet;

a locating bushing having a smaller inner diameter, said locating bushing being inserted into the locating hole of the holder plate to accommodate a variety of electric tools;

by means of the above assembly the strap is attached to the holder plate of the handle plate through the inner and outer threads and by means of the central hole the strap is slipped on the electric tool so as to reduce the vibration during operation and by means of the arrangement of the slip holes and the channel holes, the drill and driver heads are conveniently carried and stored.

2. A multipurpose handle grip for holding electric tools according to claim 1 wherein a block plate is arranged at one side of the holder plate, said block plate having a connection hole to match with a revolving screw plate for insertion of a locating rod.

* * * * *